(12) United States Patent
Wong et al.

(10) Patent No.: US 7,928,714 B2
(45) Date of Patent: Apr. 19, 2011

(54) LOAD-INDUCED VOLTAGE OVERSHOOT DETECTION AND CORRECTION IN SWITCHING POWER SUPPLIES

(75) Inventors: Kae Ann Wong, Dallas, TX (US); David W. Evans, Allen, TX (US); Joseph A. Nuniz, Richardson, TX (US); Norelis Medina, Dallas, TX (US); Siew Kuok Hoon, Menlo Park, CA (US); Wei-Chung Wu, Richardson, TX (US); Donald Thomas Pullen, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 625 days.

(21) Appl. No.: 11/775,489

(22) Filed: Jul. 10, 2007

(65) Prior Publication Data

US 2009/0015227 A1   Jan. 15, 2009

(51) Int. Cl.
    *G05F 1/00* (2006.01)
(52) U.S. Cl. ......... 323/283; 323/241; 323/282; 323/322
(58) Field of Classification Search .................. 323/238,
    323/241, 243, 271, 279, 282, 283, 321, 322,
    323/323
    See application file for complete search history.

(56) References Cited

U.S. PATENT DOCUMENTS

| | | | |
|---|---|---|---|
| 5,285,367 A | 2/1994 | Keller | |
| 5,929,619 A * | 7/1999 | Chin et al. | 323/283 |
| 5,999,433 A * | 12/1999 | Hua et al. | 363/132 |
| 6,064,187 A * | 5/2000 | Redl et al. | 323/285 |
| 6,114,842 A | 9/2000 | Simpson et al. | |
| 6,215,288 B1 | 4/2001 | Ramsey et al. | |
| 6,301,133 B1 | 10/2001 | Cuadra et al. | |
| 6,388,896 B1 | 5/2002 | Cuk | |
| 6,696,825 B2 | 2/2004 | Harris et al. | |
| 6,756,773 B2 * | 6/2004 | Koretsky et al. | 323/234 |
| 7,202,643 B2 | 4/2007 | Miftakhutdinov | |
| 2004/0189272 A1 * | 9/2004 | Matsuura et al. | 323/283 |
| 2004/0264219 A1 | 12/2004 | Zhang | |
| 2006/0043953 A1 * | 3/2006 | Xu | 323/282 |
| 2006/0072349 A1 | 4/2006 | Lin | |
| 2006/0164871 A1 | 7/2006 | Takahashi et al. | |
| 2006/0268974 A1 * | 11/2006 | Chu et al. | 375/238 |
| 2007/0041221 A1 | 2/2007 | Phadke et al. | |
| 2008/0100361 A1 * | 5/2008 | Yee et al. | 327/172 |

* cited by examiner

*Primary Examiner* — Adolf Berhane
*Assistant Examiner* — Nguyen Tran
(74) *Attorney, Agent, or Firm* — William B. Kempler; Wade J. Brady, III; Frederick J. Telecky, Jr.

(57) ABSTRACT

One embodiment of the invention includes a switching power supply system. The system includes a switch network comprising at least one switch configured to provide an output voltage based on switching activity thereof. The system also includes a switching controller configured to control the switch network to maintain the output voltage provided at an output based on a feedback signal associated with the output voltage. A converter pulse detector is configured to detect an output voltage overshoot condition based on the switching activity of the switch network corresponding to a transition in an output load to which the output voltage is provided.

20 Claims, 3 Drawing Sheets

… (1)

LOAD-INDUCED VOLTAGE OVERSHOOT DETECTION AND CORRECTION IN SWITCHING POWER SUPPLIES

TECHNICAL FIELD

This invention relates to electronic circuits, and more specifically to load-induced voltage overshoot detection and correction in switching power supplies.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. Voltage regulators have been implemented as an efficient mechanism for providing a regulated output in power supplies. One such type of regulator is known as a switching regulator or switching power supply, which controls the flow of power to a load by controlling the on and off duty-cycle of one or more high-side switches coupled to the load. Many different classes of switching power supplies exist today.

One type of switching power supply is known as a buck synchronous switching power supply or step-down synchronous switching power supply. In a buck synchronous switching supply, an inductor is used to maintain current flow that is switched from two separate sources. The two sources can include a high-side switch, such as a high-side field-effect transistor (FET), and a low-side switch, such as a low-side FET. Upon the high-side FET being turned on, the inductor is coupled to a power source through the high-side FET, causing current to flow through the inductor and thus generating an output voltage. Once the high-side FET is turned off, magnetic energy stored in the inductor dissipates to force current through the inductor. In this way, current continuously flows through the inductor in the times between activation of the high-side and the low-side switches.

The duty-cycle at which a high-side switch activates may depend on an amount of load at the output of the switching power supply. As an example, a heavier output load draws more current, thus necessitating a greater duty-cycle of activation of the high-side switch to maintain a steady output voltage based on a steady current flow through the inductor. In certain implementations, the duty-cycle at which the high-side switch activates can vary commensurate with changes in the output load.

Upon a transition of the output load, for example, from a heavy load to substantially no load, the switching power supply may experience an output voltage overshoot condition. As an example, the duty-cycle of the high-side activation could be very high during the heavy load condition, such that, upon the load changing from a heavy load to substantially no load, the output voltage rapidly increases. Because there is substantially no load, substantially no current is drawn through the inductor. As a result, the switching power supply may be unable to discharge an output capacitor to settle the output voltage to the appropriate voltage potential within an amount of time required by specification.

SUMMARY

One embodiment of the present invention includes a switching power supply system. The system includes a switch network comprising at least one switch configured to provide an output voltage based on switching activity thereof. The system also includes a switching controller configured to control the switch network to maintain the output voltage provided at an output based on a feedback signal associated with the output voltage. A converter pulse detector is configured to detect an output voltage overshoot condition based on the switching activity of the switch network corresponding to a transition in an output load to which the output voltage is provided.

Another embodiment of the present invention includes a method for substantially mitigating output voltage overshoot in a switching power supply. The method includes controlling a switch network of the switching power supply to generate an output voltage. The occurrence of an output voltage overshoot condition associated with the output voltage is detected based on switching activity of the switch network. The method further includes activating the switch network to couple the output inductor to the low supply voltage to correct the output voltage overshoot condition.

Another embodiment of the present invention includes a switching power supply system. The system includes switch means for providing an output voltage to an output load of the switching power supply system. The system also includes means for controlling switching activity of the switch means based on a feedback signal associated with the output voltage. The system further includes means for at least one of detecting and correcting an output voltage overshoot condition caused by a transition in the output load based on the switching activity of the switch means.

DETAILED DESCRIPTION

The present invention relates to electronic circuits, and more specifically to voltage overshoot detection and correction. A switching power supply may include a switching controller that includes a converter pulse detector (CPD). The converter pulse detector can receive programmable parameters associated with a pulse-width modulation (PWM) clock signal to detect an output voltage overshoot condition. The PWM clock signal can be a digital clock signal that is utilized to provide a PWM ramp signal that can be input to a switching controller of the switching power supply. The programmable parameters can include a first programmable number of PWM clock cycles associated with detecting a substantially heavy load condition and a second programmable number of PWM clock cycles to detect a substantially no load condition associated with an output load of the switching power supply. The CPD may include a counter that counts a number of consecutive PWM clock cycles that includes an activation of a high-side switch greater than the first programmable number to detect the substantially heavy load condition. In response to detecting the substantially heavy load condition, the counter can count a number of consecutive PWM ramp pulses that include no activation of the high-side switch greater than the second programmable number to detect the substantially no load condition. Thus, an output voltage overshoot condition is detected. The CPD can control the low-side switch to discharge an output capacitor to mitigate or substantially correct the output voltage overshoot condition.

It is to be understood that, as described herein, output voltage overshoot condition describes a condition in which the output voltage of a switching power supply is greater than an intended voltage potential. Under normal operation, the switching power supply may be unable to sufficiently reduce the output voltage from the overshoot condition within an amount of time that is required for a given application (e.g., as may be defined by one or more specifications). Therefore, as described herein, a substantially no load condition describes an output load that does not draw enough current or dissipate a sufficient amount of charge from the output capacitor for the output voltage to be reduced within the amount of time that is defined by the one or more specifications.

Figure 1:
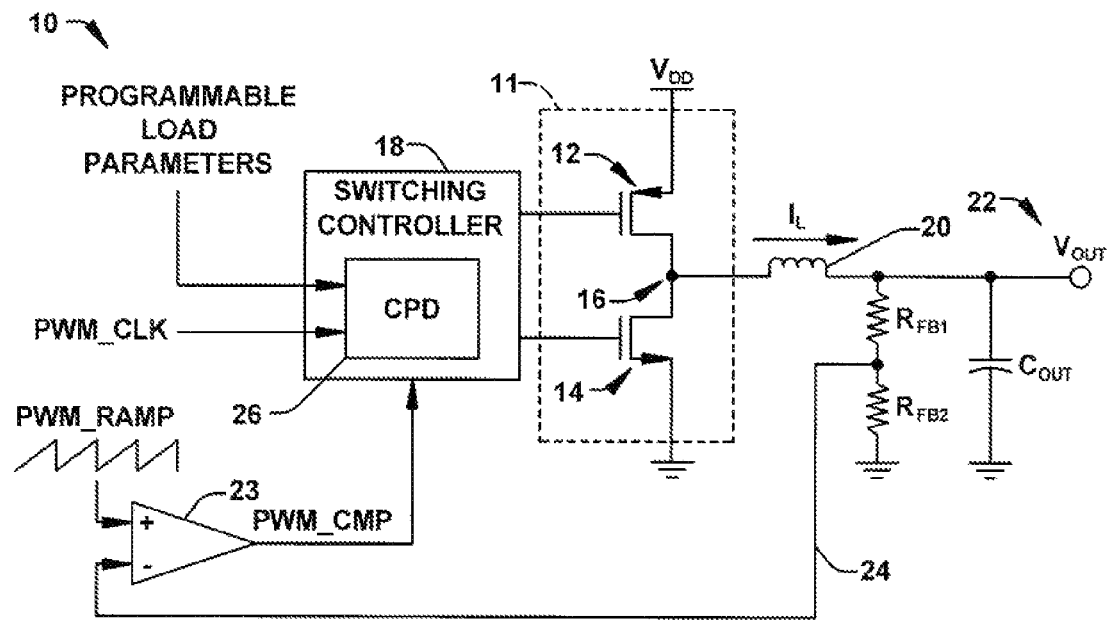
FIG. 1 illustrates an example of a switching power supply in accordance with an aspect of the invention.

FIG. 1 illustrates a switching power supply 10 in accordance with an aspect of the invention. The switching power supply 10 includes a switch network 11. In the example of FIG. 1, and as described herein, the switch network 11 includes a high-side switch 12 and a low-side switch 14 interconnected by a switching node 16, which node defines an output of the switch network. The high-side switch 12 interconnects the switching node 16 and a high supply voltage $V_{DD}$. The low-side switch 14 interconnects the switching node 16 and a low supply voltage, demonstrated as ground in the example of FIG. 1. The high-side switch 12 and the low-side switch 14 are demonstrated, respectively, in the example of FIG. 1 as a P-type and an N-type field effect transistor (FET). However, it is to be understood that the high-side switch 12 and the low-side switch 14 are not limited to FETs in the switching power supply 10. It is also to be understood that the switch network 11 is not limited to the use of a single high-side switch and single low-side switch. For example, switch network 11 typically includes a plurality of transistors arranged to implement each of the switches 12 and 14. Those skilled in the art will appreciate various arrangements of switch devices that can be employed as the switch network 11, which may vary according to application and performance requirements.

The high-side switch 12 and the low-side switch 14 receive activation signals from a switching controller 18. As an example, the switching controller 18 can activate the high-side switch 12 and the low-side switch 14 to alternately couple the switching node 16 to the positive supply voltage $V_{DD}$ and ground, respectively, by pulse width modulation (PWM). The switching node 16 is coupled to an output inductor 20 that provides an output current $I_L$ to an output 22 of the switching power supply 10. The output current $I_L$ charges an output capacitor $C_{OUT}$ that interconnects the output 22 to ground. Therefore, the switching power supply 10 generates an output voltage $V_{OUT}$ at the output 22 based on the output current $I_L$.

The switching power supply 10 includes a PWM comparator 23 configured to compare a PWM ramp signal PWM_RAMP and an output voltage feedback signal 24. The ramp signal PWM_RAMP can be a ramp signal having a substantially constant frequency. In the example of FIG. 1, the output voltage feedback signal 24 is a signal that is voltage divided from the output voltage $V_{OUT}$ by a pair of resistors $R_{FB1}$ and $R_{FB2}$. For example, the resistors $R_{FB1}$ and $R_{FB2}$ may have equal resistance values, such that the output voltage feedback signal 24 is approximately half the voltage potential of the output voltage $V_{OUT}$. The PWM comparator 23 provides a signal PWM_CMP to the switching controller 18 to set a duty-cycle of activation of the high-side switch 12. During such normal operation, the switching controller 18 controls operation of the low-side switch 14 synchronously with operation of the high-side switch 12.

The switching power supply 10 may be required by specification to respond to changes in the output load within a predefined time. For example, the switching power supply 10 may be required by specification to settle the output voltage $V_{OUT}$ within a predefined time (e.g., 100 μS) based on changes in the output load. However, a transition in the output load from a substantially heavy load to substantially no load can result in an overshoot condition of the output voltage $V_{OUT}$. For example, during a substantially heavy load condition, the high-side switch 12 may be activated with a greater duty-cycle to provide a stable output voltage $V_{OUT}$. Upon the occurrence of a rapid transition from a substantially heavy load condition to a substantially no load condition, the output voltage $V_{OUT}$ may increase to an unintended high voltage before the switching controller 18 is able to sufficiently compensate for the reduction in the output load. For instance, because of the substantially no load condition, there is substantially no current drawn from the output 22 of the switching power supply 10, such that the output capacitor $C_{OUT}$ is unable to discharge to decrease the output voltage $V_{OUT}$ to the appropriate potential. Therefore, this output voltage overshoot condition may cause an unacceptable settling time of the output voltage $V_{OUT}$ as required by application requirements.

In the example of FIG. 1, the switching controller 18 includes a converter pulse detector (CPD) 26 configured to detect the output voltage overshoot condition based on switching activity of the switch network 11. For example, the CPD 26 can detect the occurrence of the output voltage overshoot condition based on monitoring activation (and/or deactivation) of the high-side switch 12 of the switch network 11, such as via the signal PWM_CMP. As a further example, an indication of the switching activity of the switch network (represented by the signal PWM_CMP) can be determined by evaluating the signal PWM_CMP relative to a PWM clock (PWM_CLK) signal. The PWM_CLK signal is synchronized with the signal PWM_CMP. The CPD 26 can also be configured to correct the output voltage overshoot condition. For example, the CPD can correct the output voltage overshoot condition by activating the low-side switch 14 to dissipate current to ground through such switch.

The CPD 26 can be programmed based on one or more programmable load parameters, and can receive the signal PWM_CLK as an input. As an example, the PWM clock signal PWM_CLK can have a frequency that is approximately equal to the frequency of the PWM ramp signal PWM_RAMP, and can thus be substantially synchronized with the PWM ramp signal PWM_RAMP. Thus, the CPD 26 can use the PWM clock signal PWM_CLK, the signal PWM_CMP, and the programmable load parameters to detect the occurrence of an output voltage overshoot condition. For example, the CPD 26 can count a programmable number of consecutive clock cycles of the signal PWM_CLK relative to a number of activations of the high-side switch 12, such as based on the signal PWM_CMP, to detect the presence of a substantially heavy load and/or substantially no load condition of the output load of the switching power supply 10. The CPD 26 can detect the transition between such opposing load conditions to indicate the output voltage overshoot condition. Upon detecting the occurrence of the output voltage overshoot condition, the CPD 26 can take action to correct the output voltage overshoot condition. As an example, the CPD 26 can command the switching controller 18 to latch or pulse an activation signal of the low-side switch 14 to couple the output inductor 20 to ground, thus dissipating charge from the output capacitor $C_{OUT}$ to reduce the output voltage $V_{OUT}$.

It is to be understood that the switching power supply 10 is not intended to be limited to the example of FIG. 1. As an example, the switching power supply 10 can include one or more additional components to provide the output voltage $V_{OUT}$. For example, the switching power supply 10 could include a freewheeling diode configured in parallel with the low-side switch 14. As another example, the switching power supply 10 could include one or more additional switching phases, each having separate high-side and low-side switches configured to control current flow through separate inductors. Thus, the CPD 26 could detect and correct a voltage overshoot condition associated with all of the phases of the switching power supply 10. Therefore, it is to be understood that the switching power supply 10 can be configured in any of a variety of different ways.

Figure 2:
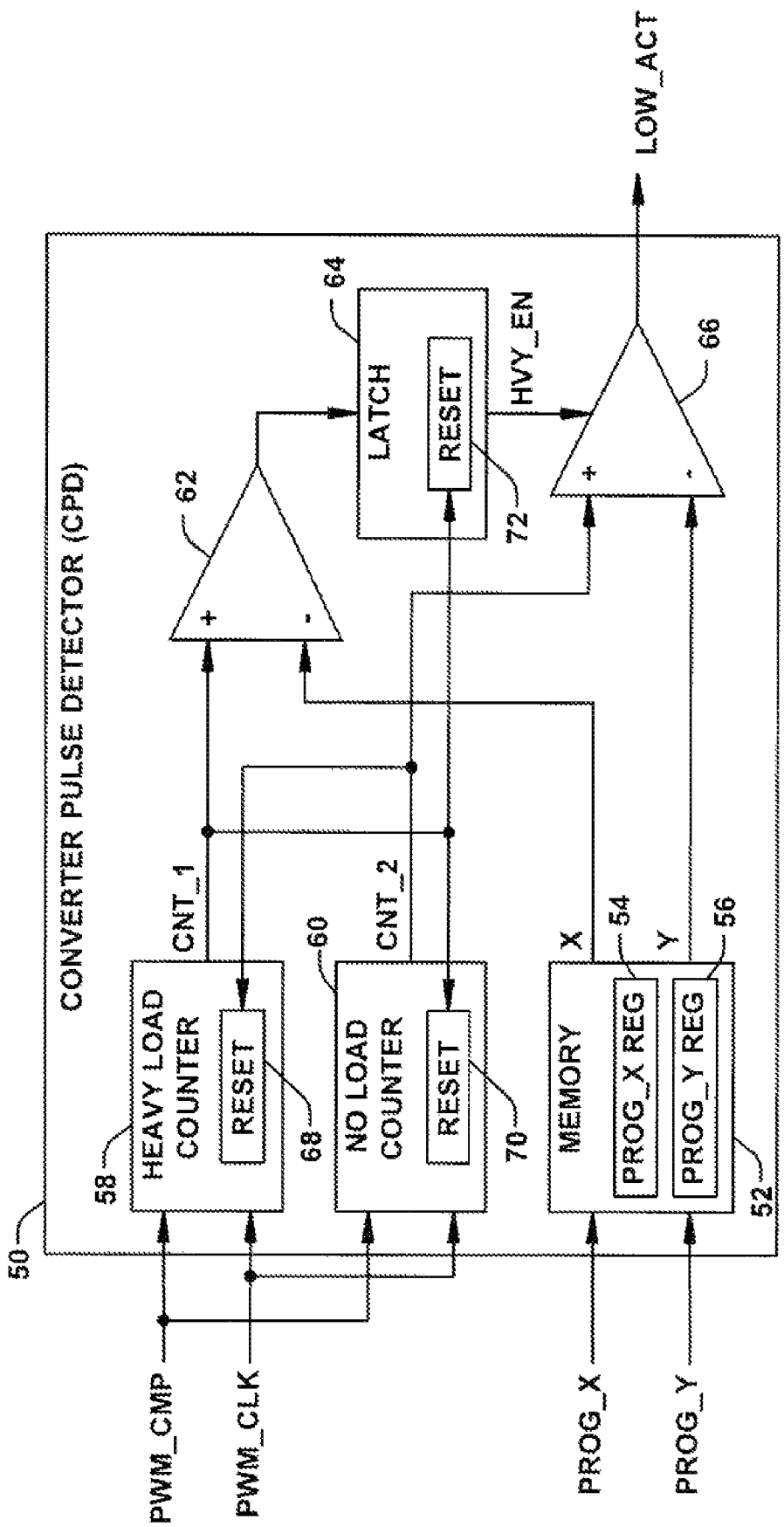
FIG. 2 illustrates an example of a converter pulse detector in accordance with an aspect of the invention.

FIG. 2 illustrates an example of a CPD 50 in accordance with an aspect of the invention. The CPD 50 can be configured substantially similar to the CPD 26 in the example of FIG. 1. Therefore, reference is to be made to the example of FIG. 1 in the discussion of the example of FIG. 2. In addition, the CPD 50 can be configured as part of a switching controller, such as demonstrated by the CPD 26 being configured as part of the switching controller 18 in the example of FIG. 1, or can be configured separately from a switching controller that is associated with a given switching power supply.

The CPD 50 includes a memory 52 configured to input and store programmable load parameters. The memory 52 could be any of a variety of types of volatile and/or non-volatile memory devices, such as a flash memory, EEPROM, or any of a variety of RAM devices. In the example of FIG. 2, the programmable load parameters are demonstrated as a heavy-load parameter PROG_X and a no-load parameter PROG_Y. The programmable load parameters can be predetermined, such that they are permanently set upon manufacturing the switching power supply 10, or can be adjustable, such as via software and/or hardware settings. The heavy-load parameter PROG_X and the no-load parameter PROG_Y can correspond to a programmable number of consecutive clock cycles X of the signal PWM_CLK for detection of a substantially heavy load condition and a programmable number of consecutive clock cycles Y of the signal PWM_CLK for detection of a substantially no load condition, respectively. The programmable number of consecutive clock cycles X and the programmable number of consecutive clock cycles Y are stored, respectively, in a PROG_X register 54 and a PROG_Y register 56. Each of the PROG_X register 54 and the PROG_Y register 56 can be set to different values, which may be selected from a set of preset values, based on different applications of the switching power supply 10.

The CPD 50 also includes a heavy load counter 58 and a no load counter 60 that are each configured to receive the signal PWM_CLK and a signal PWM_CMP as inputs. The signal PWM_CMP can be a signal corresponding to activation of the high-side switch 12 of the switching power supply 10. As an example, the signal PWM_CMP can be a substantial copy of the activation signal provided to the high-side switch 12 from the switching controller 18, such that the signal PWM_CMP can have a rising edge that is substantially timed with the activation signal to the high-side switch 12. As another example, the signal PWM_CMP can correspond to the activation signal of the high-side switch 12 itself, such as output from the PWM comparator 23.

The heavy load counter 58 and the no load counter 60 can each include combinational logic that increments a number of counts CNT_1 and CNT_2, respectively, based on a specific combination of the signal PWM_CLK and the signal PWM_CMP. In the example of FIG. 2, the number of counts CNT_1 can indicate the occurrence of a substantially heavy load condition. For example, the heavy load counter 58 can increment the number of counts CNT_1 for every consecutive clock cycle of the signal PWM_CLK that includes an activation of the high-side switch 12. Similarly, the number of counts CNT_2 can indicate the occurrence of a substantially no load condition. For example, the no load counter 60 can increment the number of counts CNT_2 for every consecutive clock cycle of the signal PWM_CLK that includes no activation of the high-side switch 12.

The CPD 50 includes a first comparator 62 configured to detect the substantially heavy load condition. In the example of FIG. 2, the first comparator 62 is configured to compare the number of counts CNT_1 with the programmable number of clock cycles X. Upon the number of counts CNT_1 being greater than the programmable number of clock cycles X, a substantially heavy load condition is detected. The first comparator 62 thus provides an output to a latch 64 configured to provide a latched signal HVY_EN that indicates the occurrence of the substantially heavy load condition.

The CPD 50 also includes a second comparator 66 that is configured to detect the substantially no load condition. In the example of FIG. 2, the second comparator 66 is configured to compare the number of counts CNT_2 with the programmable number of clock cycles Y upon being enabled by the latched signal HVY_EN. Therefore upon the number of counts CNT_2 being greater than the programmable number of clock cycles Y, a substantially no load condition is detected. However, when the substantially no load condition is detected subsequent to detecting the substantially heavy load condition, such that the latched signal HVY_EN is activated, the detection of the substantially no load condition corresponds to detection of an output voltage overshoot condition.

In response to detecting the output voltage overshoot condition, the second comparator 66 generates a signal LOW_ACT. The signal LOW_ACT can be provided to the switching controller 18 to control the low-side switch 14 to reduce the output voltage $V_{OUT}$. For instance, the switching controller can activate the low-side switch 14 to dissipate the charge from the output capacitor $C_{OUT}$ to ground. As an example, the signal LOW_ACT can be latched, such that the low-side switch 14 is activated for an amount of time that is sufficient for the output voltage $V_{OUT}$ to be reduced to an acceptable voltage potential. For example, the low-side switch 14 can remain activated (e.g., in an ON condition) for a predetermined amount of time, or can remain activated until the output voltage $V_{OUT}$ is reduced to a predetermined potential, such as indicated by the output voltage feedback signal 24. As another example, the switching controller or the CPD can activate the low-side switch 14 by providing a pulsed (or modulated) activation signal to discharge the output capacitor $C_{OUT}$ until the output voltage $V_{OUT}$ is reduced to a sufficient potential. It will be understood that the CPD could provide the signal LOW_ACT as pulsed signal to implement such operation or the LOW_ACT signal can be processed to generate an appropriate pulsed activation signal.

It is to be understood that, in some existing switching power supply circuits, the low-side switch can be deactivated upon detection of a current flow from an output inductor to ground. In the system 10 of FIG. 1, however, the CPD 26 can effect activation of the low-side switch 14 to dissipate charge from the output capacitor $C_{OUT}$, even upon a detected current flow from the inductor 20 to ground. It is also to be understood that, while the signal LOW_ACT is logic high, the high-side switch 12 remains deactivated to prevent a shoot-through condition of the positive supply voltage $V_{DD}$ to ground.

In the example of FIG. 2, the heavy load counter 58, the no load counter 60, and the latch 64 include reset blocks 68, 70 and 72, respectively. The reset block 68 can reset the number of counts CNT_1 to zero in response to detecting no activation of the high-side switch 12 during a PWM clock cycle. For example, the reset block 68 can detect the inactivity of the high-side switch 12 when the number of counts CNT_2 increments. The reset blocks 70 and 72 can be activated to reset the counter 60 and the latch 64 if the counter 58 incrementing its count CNT_1 value. For example, the counter 60 resets its number of counts CNT_2 to zero and the latch 64 can be reset (e.g., HVY_EN is unlatched) upon the occurrence of a clock cycle including an activation of the high-side switch 12. Therefore, when the switching power supply 10 no longer resides in a substantially heavy load condition or in a substantially no load condition, the CPD 50 resets the process states for detecting the output voltage overshoot condition.

It is to be understood that the CPD 50 is not intended to be limited to the example of FIG. 2. Specifically, one or more components of the CPD 50 are not demonstrated in the example of FIG. 2 for the sake of simplicity. For example, as described above, the counter 58 can include combinational logic to increment the number of counts CNT_1 and CNT_2, such as based on the logic state of the signal PWM_CMP. As another example, the resets of each of the heavy load counter 58, no load counter 60, and latch 64 can be activated in any of a variety of other ways, and is thus not limited to the example demonstrated in FIG. 2. Accordingly, the CPD 50 can be configured in any of a variety of ways according to an aspect of the invention.

Figure 3:
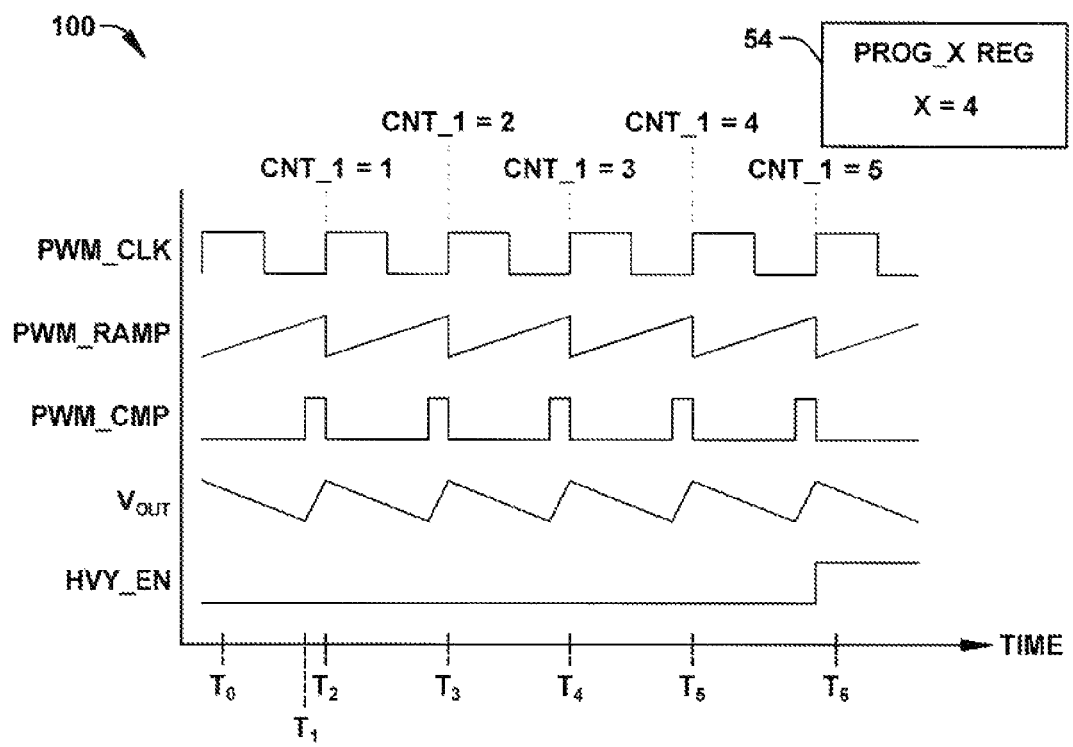
FIG. 3 illustrates an example of a timing diagram associated with detecting a heavy load condition in accordance with an aspect of the invention.

FIG. 3 illustrates an example of a timing diagram 100 associated with detecting a heavy load condition in accordance with an aspect of the invention. The timing diagram 100 can correspond to the operation of the CPD 26 in the example of FIG. 1 and/or the CPD 50 in the example of FIG. 2. Therefore, reference is to be made to the examples of FIGS. 1 and 2 in the discussion of the example of FIG. 3.

The timing diagram 100 includes the signal PWM_CLK, the signal PWM_RAMP, the signal PWM_CMP, the output voltage $V_{OUT}$, and the latched signal HVY_EN plotted over time. The signal PWM_RAMP is demonstrated as a sawtooth pattern signal of substantially constant frequency, with each rising-edge defining the beginning of a clock cycle. The signal PWM_CLK is demonstrated as a clock signal that is substantially synchronized with the signal PWM_RAMP. The signal PWM_CMP can correspond to an output of a PWM comparator that can be used to provide the activation signal of the high-side switch 12. Therefore, at each pulse of the signal PWM_CMP, the output voltage $V_{OUT}$ increases based on the coupling of the output inductor 20 to the positive supply voltage $V_{DD}$ via the high-side switch 12. Upon the signal PWM_CMP being deasserted (i.e., logic low), the output voltage $V_{OUT}$ decreases as a result of the current draw of the output load at the output 22 of the switching power supply 10.

In the example of FIG. 3, it is assumed that the PROG_X register 54 stores a value of four for the programmable number of counts X (e.g., X=4). Thus, five consecutive clock cycles of the signal PWM_CLK that include an activation of the high-side switch 12 can indicate a substantially heavy load condition. At a time $T_0$, a cycle of the signal PWM_CLK begins. It is to be assumed that, in the description of the example of FIG. 3, that the signal PWM_CMP is deasserted for at least the previous cycle of the signal PWM_CLK. At a time $T_1$, the signal PWM_CMP is asserted (i.e., logic high) for a short duration commensurate with the pulse-width of the control signal. Therefore, the high-side switch 12 is activated. Accordingly, the output voltage $V_{OUT}$ increases sharply at the time $T_1$ for the duration of the pulse of the signal PWM_CMP.

At a time $T_2$, the cycle of the signal PWM_CLK that had begun at the time $T_0$ ends and a new cycle of the signal PWM_CLK begins. During the cycle of the signal PWM_CLK beginning at the time $T_0$, the signal PWM_CMP was activated. Therefore, the counter 58 increments the number of counts CNT_1 in the CNT_1 register 60 to CNT_1=1. Subsequently, at a time $T_3$, the counter increments the number of counts CNT_1 to CNT_1=2, to CNT_1=3 at a time $T_4$, to CNT_1=4 at a time $T_5$, and to CNT_1=5 at a time $T_6$ based on the previous cycle of the signal PWM_CLK including an activation of the high-side switch 12 based on the signal PWM_CMP. Therefore, at the time $T_6$, a substantially heavy load condition is detected based on the number of counts CNT_1 being greater than the programmable number of counts X. Accordingly, at the time $T_6$, the latched signal HVY_EN is asserted to indicate the substantially heavy load condition.

Figure 4:
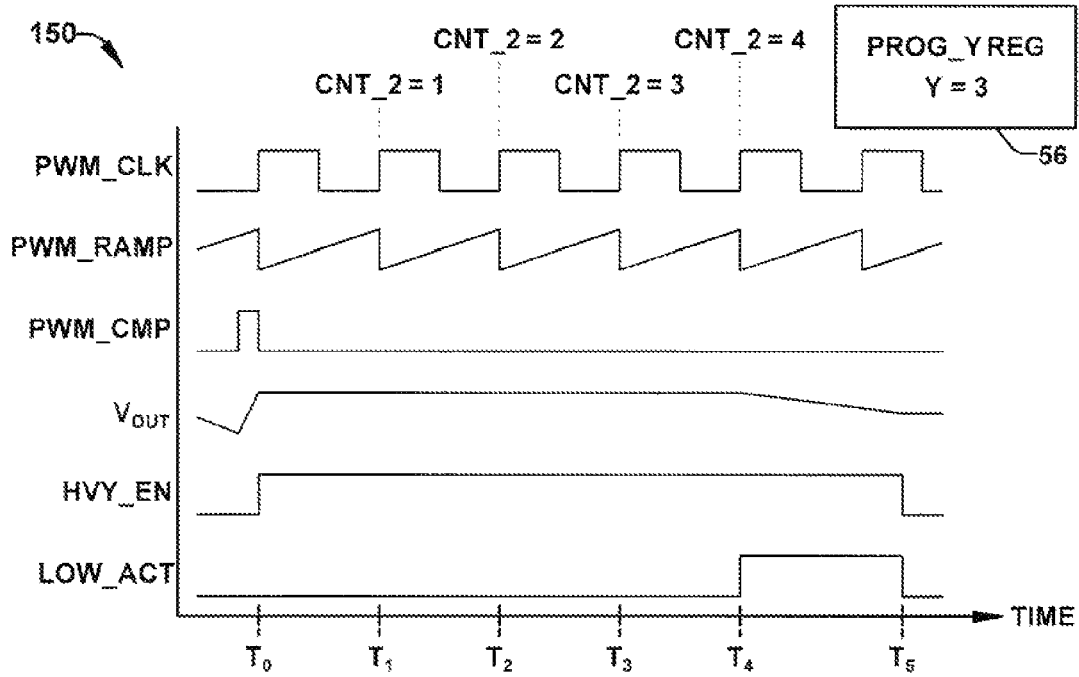
FIG. 4 illustrates an example of a timing diagram associated with detecting a substantially no load condition in accordance with an aspect of the invention.

FIG. 4 illustrates an example of a timing diagram 150 associated with detecting a substantially no load condition in accordance with an aspect of the invention. Similar to the example of FIG. 3 above, the timing diagram 150 can correspond to the operation of the CPD 26 in the example of FIG. 1 and/or the CPD 50 in the example of FIG. 2. Therefore, reference is to be made to the examples of FIGS. 1 and 2 in the discussion of the example of FIG. 4.

The timing diagram 150 includes the signal PWM_CLK, the signal PWM_RAMP, the signal PWM_CMP, the output voltage $V_{OUT}$, the latched signal HVY_EN, and the signal LOW_ACT over time. In the example of FIG. 4, the PROG_Y register 56 stores a value of three for the programmable number of counts Y. Thus, four consecutive clock cycles of the signal PWM_CLK that include no activation of the high-side switch 12 can indicate a substantially no load condition.

At a time $T_0$, a next cycle of the signal PWM_CLK begins, and the latched signal HVY_EN is asserted. Thus, at the time $T_0$, it is assumed that a substantially heavy load condition has been detected, such as described above in the example of FIG. 3. It is to be understood that the latched signal HVY_EN is asserted at the time $T_0$ as an example, and that the latched signal HVY_EN could have been asserted previous to the time $T_0$ in the example of FIG. 4. At a time $T_1$, the cycle of the signal PWM_CLK that had begun at the time $T_0$ ends and a new cycle of the signal PWM_CLK begins. During the cycle of the signal PWM_CLK beginning at the time $T_0$, the signal PWM_CMP is not activated. Therefore, the counter 58 increments the number of counts CNT_2 in the CNT_2 register 62 to CNT_2=1. Subsequently, at a time $T_2$, the counter increments the number of counts CNT_2 to CNT_2=2, to CNT_2=3 at a time $T_3$, and to CNT_2=4 at a time $T_4$ based on the previous cycle of the signal PWM_CLK including no activation of the high-side switch 12, as demonstrated by the logic low signal PWM_CMP. Therefore, at the time $T_4$, a substantially no load condition is detected based on the number of counts CNT_2 being greater than the programmable number of counts Y following a heavy load condition indicated by the state of the latched signal HVY_EN. Accordingly, at the time $T_4$, the signal LOW_ACT is asserted to indicate the substantially no load condition, and thus the output voltage overshoot condition.

The output voltage overshoot condition is further demonstrated in the example of FIG. 4 by the output voltage $V_{OUT}$ having a high potential relative to the time prior to the time $T_0$ that does not decrease throughout the duration of the time $T_0$ the time $T_4$. At the time $T_4$, the low-side switch 14 is activated based on the signal LOW_ACT. Therefore, the output voltage $V_{OUT}$ decreases until a time $T_5$. At the time $T_5$, the output voltage $V_{OUT}$ has decreased to a potential that is intended in the operation of the switching power supply 10. Therefore, at the time $T_5$, the signal LOW_ACT is deasserted based on a predetermined duration of time of activation of the low-side switch. Alternatively, signal LOW_ACT can be deasserted based on the output voltage feedback signal 24 indicating the appropriate output voltage $V_{OUT}$ to the switching controller 18.

It is to be understood that the operation of systems and methods according to the invention are not limited to the example timing diagrams 100 and 150 of FIGS. 3 and 4, respectively. Specifically, it is to be understood that the timing diagrams 100 and 150 are demonstrated as ideal timing diagrams for the sake of simplicity. In addition, the programmable number of counts X and Y need not be limited to four and three, respectively, but can be separately and independently programmable and can have greater or lower values. Furthermore, the interaction between the signals and the associated timing can differ from that demonstrated in the examples of FIGS. 3 and 4. For example, the number of counts CNT_1 can be incremented at the rising edge of the signal PWM_CMP, as opposed to the rising edge of the next cycle of the signal PWM_CLK. Therefore, the components of the switching power supply 10 in the example of FIG. 1 and the CPD 50 in the example of FIG. 2 can be configured in any of a variety of ways to implement the timing of the signals demonstrated in the example of FIGS. 3 and 4. Moreover, those skilled in the art will understand and appreciate a variety of means that can be employed for tracking switching activity of the high-side switch 12 and for detecting a substantially heavy load condition followed by a substantially no load condition.

Figure 5:
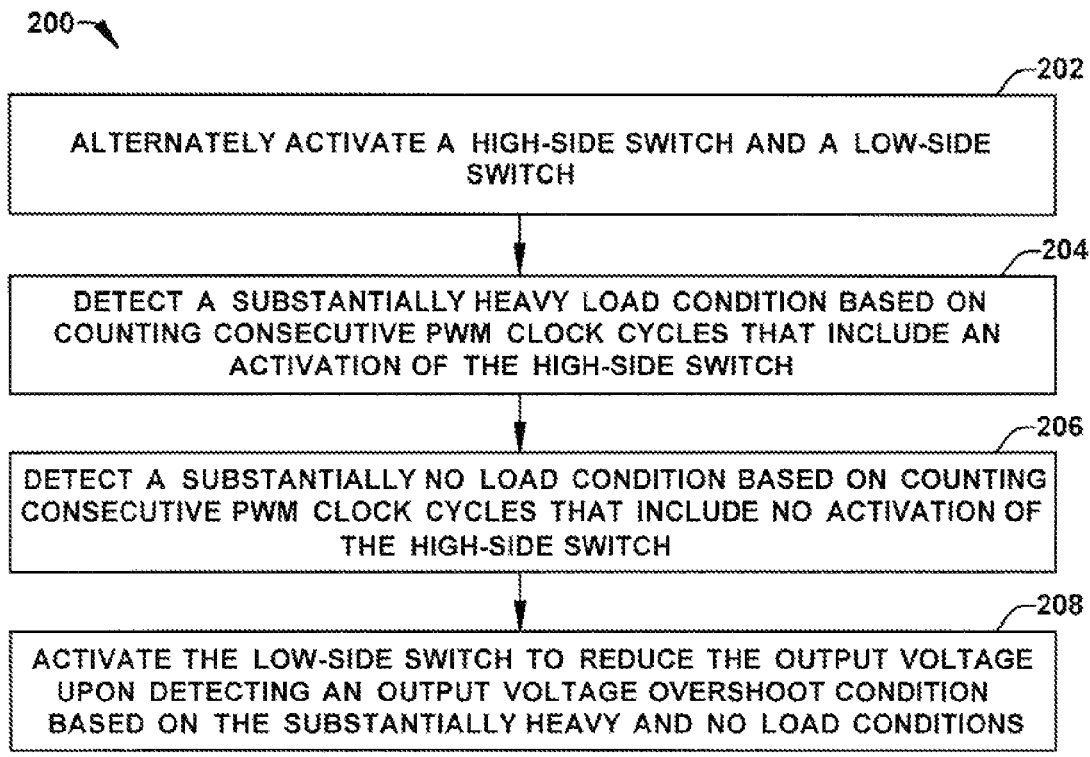
FIG. 5 illustrates a method for substantially mitigating an output voltage overshoot condition in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates a method 200 for substantially mitigating an output voltage overshoot condition in accordance with an aspect of the invention. At 202, a high-side switch and a low-side switch are activated to provide a corresponding output voltage. The high-side switch and the low-side switch can alternately couple an output inductor to a high supply voltage and a low supply voltage, such as ground, to generate an output current, which in turn generates an output voltage. At 204, a substantially heavy load condition is detected based on counting consecutive PWM clock cycles that include an activation of the high-side switch. The clock cycles can be based on a PWM clock signal that is substantially synchronized with a PWM ramp signal. The number of clock cycles that indicate a heavy load condition can be based on a programmable number (e.g., a preset count value) stored in a memory.

At 206, a substantially no load condition is detected based on counting consecutive PWM clock cycles that include no activation of the high-side switch. The number of clock cycles that indicate a substantially no load condition can be stored in the memory as a programmable number (e.g., a preset count value), which programmable number may be separate from that for detecting the substantially heavy load. The detection of the substantially no load condition subsequent to the substantially heavy load condition can be indicative of the output voltage overshoot condition. At 208, the low-side switch is activated to reduce the output voltage upon the detection of an output voltage overshoot condition based on detecting the substantially heavy and no load conditions. The low-side switch can be activated for a predetermined amount of time, or can be deactivated upon the output voltage being reduced to a predetermined amount based on an output voltage feedback signal. The low-side switch can also be pulsed to reduce the output voltage upon detecting the output voltage overshoot condition.

What have been described above are examples of the invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of this application including the appended claims.

What is claimed is:

1. A switching power supply system comprising:
a switch network comprising at least one switch configured to provide an output voltage based on switching activity thereof;
a switching controller configured to control the switch network to maintain the output voltage provided at an output based on a feedback signal associated with the output voltage; and
a converter pulse detector configured to detect an output voltage overshoot condition based on the switching activity of the switch network corresponding to a transition in an output load to which the output voltage is provided, wherein the converter pulse detector is responsive to a first number of consecutive clock cycles of a pulse-width modulation (PWM) clock signal during which the switching controller provides an activation signal to a high-side switch of the switch network to indicate the substantially heavy load condition and a second number of consecutive clock cycles during which the switching controller provides no activation signals to the high-side switch to indicate the substantially no load condition.

2. The system of claim 1, wherein the converter pulse detector is configured to detect and to correct the output voltage overshoot condition in response to the transition corresponding to a change in the output load from a substantially heavy load condition to a substantially no load condition.

3. The system of claim 2, further comprising a memory configured to store programmable parameters that define the substantially heavy load condition and to the substantially no load condition.

4. The system of claim 3, wherein, the PWM clock signal is substantially synchronized with a PWM ramp signal.

5. The system of claim 1, wherein the converter pulse detector, upon detecting the output voltage overshoot condition, commands the switching controller to one of latch and pulse an activation signal of a low-side switch of the switch network to reduce the output voltage to correct the output voltage overshoot condition.

6. The system of claim 1, wherein the converter pulse detector comprises a counter configured to count a number of consecutive clock cycles of a PWM clock signal relative to activations of a high-side switch of the switch network to detect the output voltage overshoot condition, the PWM clock signal being substantially synchronized with a PWM ramp signal.

7. The system of claim 6, wherein the number of consecutive clock cycles comprises a first programmable number, and wherein the converter pulse detector further comprises a first comparator configured to latch an enable signal if a number of activations of the high-side switch is greater than the first programmable number, the enable signal indicating a substantially heavy load condition for the output load.

8. The system of claim 7, wherein the converter pulse detector further comprises a second comparator configured to activate a low-side switch of the switch network in response to the enable signal being latched and a substantially no load condition of the output load, the substantially no load condition being determined if the number of activations of the high-side switch is zero upon and the number of consecutive clock cycles being greater than a second programmable number.

9. A method for substantially mitigating output voltage overshoot in a switching power supply, the method comprising:
controlling a switch network of the switching power supply to generate an output voltage;
detecting an occurrence of an output voltage overshoot condition associated with the output voltage based on switching activity of the switch network, wherein a first number of consecutive clock cycles of a pulse-width modulation (PWM) clock signal during which a switching controller provides an activation signal to a high-side switch of the switch network is indicative of a substantially heavy load condition and a second number of consecutive clock cycles during which the switching controller provides no activation signals to the high-side switch is indicative of a substantially no load condition; and
controlling the switch network to couple the output to a low supply voltage to correct the output voltage overshoot condition.

10. The method of claim 9, wherein detecting the occurrence of the output voltage overshoot condition comprises detecting a transition from a substantially heavy load condition to a substantially no load condition associated with an output load to which the output voltage is provided.

11. The method of claim 9, further comprising programming at least one parameter associated with a number of cycles of a pulse-width modulation (PWM} clock signal to a memory, the PWM clock signal being utilized to control the switch network, and
wherein detecting the occurrence of the output voltage overshoot condition further comprises detecting the occurrence of the output voltage overshoot condition based on the at least one parameter relative to the switching activity of the switch network.

12. The method of claim 11, wherein detecting the occurrence of the output voltage overshoot condition based on the at least one parameter further comprises comparing the number of cycles of the PWM clock signal with the at least one parameter relative to a number of activations of a high-side switch of the switch network.

13. The method of claim 12, wherein comparing the number of cycles of the PWM clock signal with the at least one parameter further comprises:
comparing a number of consecutive cycles of the PWM clock signal in which an activation of the high-side switch has occurred with a first programmable parameter to detect a substantially heavy load condition; and
comparing a number of consecutive cycles of the PWM clock signal in which no activation of the high-side switch has occurred with a second programmable parameter to determine a substantially no load condition subsequent to detecting the substantially heavy load condition.

14. The method of claim 13, further comprising latching an enable signal in response to detecting the substantially heavy load condition, such that comparing the number of consecutive cycles of the PWM clock signal in which no activation of the high-side switch occurred with the second programmable parameter occurs in response to the latching of the enable signal.

15. The method of claim 9, wherein controlling the switch network to couple the output to the low supply voltage comprises:
monitoring the output voltage based on a feedback signal; and
deactivating a low-side switch of the switch network after the output voltage has reduced to within a predetermined voltage.

16. A switching power supply system comprising:
switch means for providing an output voltage to an output load of the switching power supply system;
means for controlling switching activity of the switch means based on a feedback signal associated with the output voltage; and
means for at least one of detecting and correcting an output voltage overshoot condition caused by a transition in the output load based on the switching activity of the switch means, the means for at least one of detecting and correcting being responsive to a first number of consecutive clock cycles of a pulse-width modulation (PWM) clock signal during which the means for controlling provides an activation signal to a high-side switch of the switch means to indicate the substantially heavy load condition and a second number of consecutive clock cycles during which the switch means provides no activation signals to the high-side switch to indicate the substantially no load condition.

17. The system of claim 16, wherein the output voltage overshoot condition is caused by a change from a substantially heavy load condition to a substantially no load condition at the output load.

18. The system of claim 17, further comprising means for storing at least one programmable parameter that provides an indication of the substantially heavy load condition and the substantially no load condition based on a pulse-width modulation (PWM) clock signal that is substantially synchronized with a PWM ramp signal.

19. The system of claim 18, wherein the switch means further comprises at least a high-side switch and wherein the at least one programmable parameter comprises a first programmable parameter associated with the substantially heavy load condition, and
wherein the means for at least one of detecting and correcting the output voltage overshoot condition further comprises means for comparing a number of consecutive cycles of the PWM clock signal in which an activation of the high-side switch occurred with the first programmable parameter.

20. The system of claim 19, wherein the at least one programmable parameter comprises a second programmable parameter associated with the substantially no load condition, and
wherein the means for at least one of detecting and correcting the output voltage overshoot condition comprises means for comparing a number of cycles of the PWM clock signal in which no activation of the high-side switch occurred with the second programmable parameter following the substantially heavy load condition.

* * * * *